Nov. 12, 1929.  J. F. BERNHARDT  1,735,371

SPRING

Filed Jan. 5, 1928

INVENTOR
Joseph F. Bernhardt
by C. M. Clarke
Atty.

Patented Nov. 12, 1929

1,735,371

UNITED STATES PATENT OFFICE

JOSEPH F. BERNHARDT, OF DU BOIS, PENNSYLVANIA, ASSIGNOR TO TRIANGLE AUTOMOBILE SPRING COMPANY, OF DU BOIS, PENNSYLVANIA, A CORPORATION OF PENNSYLVANIA

SPRING

Application filed January 5, 1928. Serial No. 244,624.

My invention consists of an improvement in springs, and more particularly in leaf springs of the kind usually employed with vehicles of various kinds for spring suspension of loads.

In springs of the same general kind the supporting and re-acting effect of the spring member or members is mainly due to the resiliency of the leaves and certain added effect resulting from the frictional action between the leaves.

In the ordinary manufacture of such springs the leaves are secured together either by surrounding clips or by bolts or in any other manner adapted to hold the leaves in as tight contact as possible.

However, due to the wear of the leaves in use, such binding elements become less effective with use, with resulting reduction of friction, and in any case the main function of the spring is carried out through its resilient load supporting action, with alternating rebound, depending on the condition of the road surface.

Ordinarily, the rebounding action is approximately the same as the depressing action, resulting in undesirable re-active movements, necessitating the use of shock absorbers, snubbers and the like, designed to counter-act and absorb the re-active movements.

My invention has in view to provide means for effecting a wide range of frictional action within the spring itself, particularly between those portions of the spring leaves subject to the greatest extent of movement, whereby to effect in a spring of the leaf type a self-contained friction producing and shock absorbing element or member. I accomplish these results in a comparatively simple, efficient, and economical manner by a novel assemblage of the leaves of the spring and in its mounting on the vehicle. Also, by combining with the main spring resiliently acting means for varying the clamping and friction-producing action between the several main leaf members, so as to effect absorption of the shocks of travel as they occur.

The main object in view is to so construct the spring that it will maintain a substantially straight or horizontal position under a normal load on a level roadway. Also, whereby the spring will rebound in either direction upon riding over either upward or downward variations in the roadway without imparting material movement to the vehicle body, by substantially complete absorption of the shocks in the spring itself, without the use of supplemental snubbers or the like.

Referring to the drawings showing one preferred embodiment of the invention:

Figure 1:
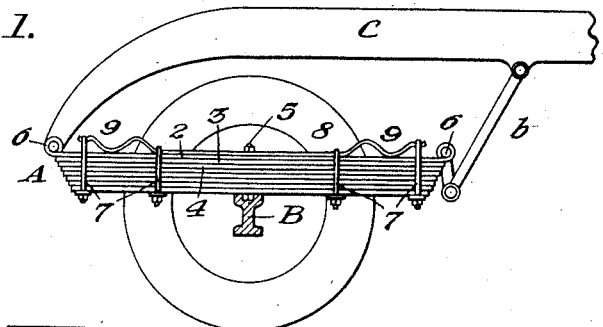
Fig. 1 is a view in side elevation showing the spring in operative location in normal position under load.
Figure 2:
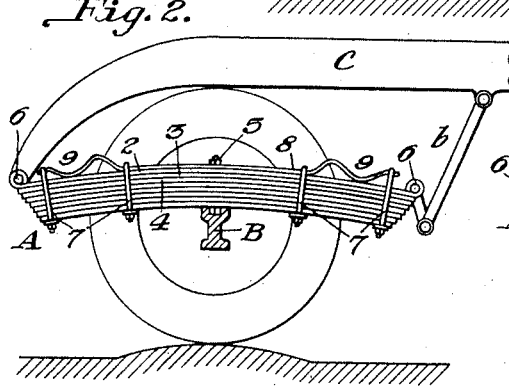
Fig. 2 is a similar view illustrating the action of the spring in riding over a rise or hump in the roadway.
Figure 3:
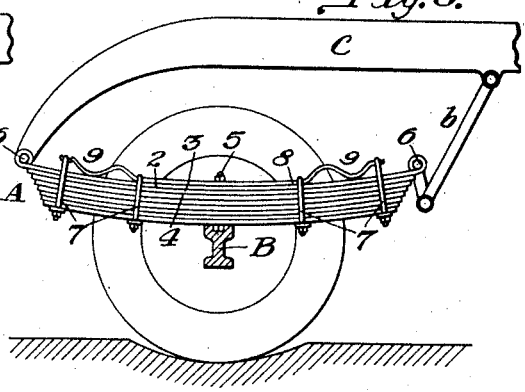
Fig. 3 is a similar view showing action in riding over a depression.
Figure 6:
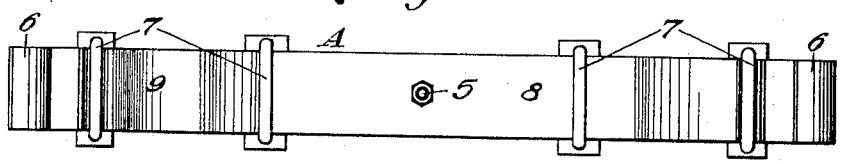
Fig. 6 is a plan view of Fig. 4.
Figure 4:
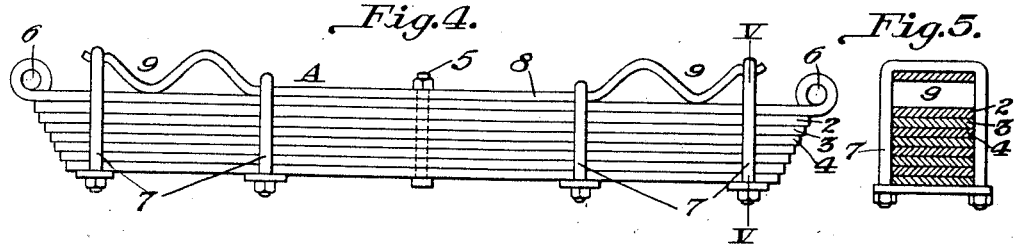
Fig. 4 is an enlarged view of the spring, as in Fig. 1.
Figure 5:
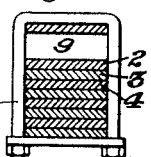
Fig. 5 is a cross section on the line V—V of Fig. 4.

Referring to the drawings, the spring A is composed of a series of leaves 2, 3, 4, etc., approximating the entire length of the whole spring, but each slightly shorter than the adjacent upper leaf, as shown.

The entire group of leaves is thus assembled in a complete spring unit of substantially the same strength and area in cross section from one end to the other, with comparatively blunt ends, due to the successive leaves being but slightly shorter successively through the group.

In this manner each leaf is in contact with its next adjacent leaf, with but correspondingly slight reduction of friction area, so as to develop a high degree of re-acting friction after each deflection in either direction, from a normal straight position under a mean load.

The several leaves are connected at the middle in any suitable manner, as by a bolt 5, and rest at their middle against any movement imparting and load supporting unit, as the axle B of the vehicle.

The uppermost leaf is provided with terminal eyes 6 for shackle or other connection, as by links b, with the load supporting element, as chassis frame C, of an automobile. The other end of the leaf is connected by its eye 6 with the frame, either directly or by a link connection, so as to distribute the load evenly from end to end.

At suitable points the several main leaves of the spring are connected by any suitable number of embracing clips or clamps 7 of well known construction, for holding the several leaves edgewise in alinement in a complete group, according to well known practice. These are provided with nuts or other adaptable means for varying the tight clamping action between the several leaves, with resulting increased or decreased friction between the leaves in deflection either way from their substantially straight normal load position.

Such frictional effect is greatly increased by maintaining approximately equal length of the several leaves throughout, thereby greatly increasing their frictional area. Thus, the relative longitudinal movement of the leaves and their frictional contact with each other is in a correspondingly relative proportion, with a variable frictional action, dependent on the deflective movement of the spring.

Supplementing the frictional binding action between the main leaves, I utilize a supplemental outer leaf 8, the inner or middle body portion is clamped tightly against the next adjacent leaf 2 by the center bolt 5 and clamps 7. The outer end portions of leaf 8, however, is undulating or waving as shown at 9, with one or more inwardly extending portions bearing against the next adjacent leaf 2 and the free resilient terminals spaced outwardly as shown.

The outermost clamps 7 engage said terminals, so that by tightening them, an increased inward and somewhat resilient pressure is exerted and transmitted through the outer portions of the main group of leaves at each end.

By the use of the main group of approximately equal length spring leaves, supplemented by the outer undulating resilient of free terminal spring member 8, I am enabled to greatly increase and regulate the binding action between the main active portions of the entire spring. I thus accomplish the desirable result and effect of interposing a very large frictional resistance and re-acting retardation against bounding and rebounding movement. At the same time the load supporting value of the spring is in no way reduced, but maintained at its maximum, with the accompanying self-contained and valuable quality of the inherent check or control of rebounding action.

A further valuable advantage in the construction is that the re-acting or re-bounding action of the spring, by upward or downward movement of its middle portion upon riding over either a hump or depression, with its terminals connected with the chassis frame as shown, is that such connections always oppose inwardly directed resistance towards the middle of the spring. There is thus a constant tendency to oppose outward or free movement of the spring terminals, so that such inwardly directed resistance assists in the confining friction producing action between the several main leaves, at each upward or downward re-bounding movement of the middle of the spring.

As thus constructed and mounted the wheels and axle of the vehicle in travel may move abruptly either upwardly or downwardly, without imparting material movement to the frame and car body, so that they will continue to move along in a substantially unvarying plane, with but slight undulation or jarring, and avoiding the usual shocks of road transportation.

The improvement provides increased carrying capacity over the present ordinary type of spring construction, bringing into play all frictional resistance embodied in the spring within its limits. Because of such increased capacity, lighter and less costly springs may be employed to carry the normal load.

It will be understood that the invention may be variously changed in different details or other features by the skilled mechanic, and it may be utilized in any suitable size, proportions, weight, etc., dependent on the conditions of use, and that all such changes are to be understood as within the scope of the following claims.

What I claim is:—

1. The combination with a main spring formed of a plurality of superposed leaves adapted to be connected to a vehicle, of an auxiliary spring having a fixed inner portion, a bowed portion, said fixed inner portion and bowed portion being in engagement with the upper face of the uppermost leaf near an end thereof, and a movable end portion spaced from said uppermost leaf, and means connecting said main spring and said movable end portion of said auxiliary spring whereby downward deflection of said end of the main spring increases the pressure of said auxiliary spring to increase the friction between said superposed leaves.

2. The combination with a main spring formed of a plurality of superposed leaves adapted to be connected to a vehicle, of an auxiliary spring having at both ends of the main spring a fixed inner portion, a bowed portion, said fixed inner portion and bowed portion being in engagement with the upper face of the uppermost leaf, and a movable end portion spaced away from said uppermost leaf, and means connecting said main spring and said movable end portions of said auxiliary spring whereby the downward deflection of the ends of the main spring increases the pressure of said auxiliary spring to increase the friction between said superposed leaves.

In testimony whereof I hereunto affix my signature.

JOSEPH F. BERNHARDT.